June 9, 1936. J. D. MORGAN 2,043,931
MOTOR TIMING METHOD AND APPARATUS
Filed Aug. 15, 1933 2 Sheets-Sheet 2
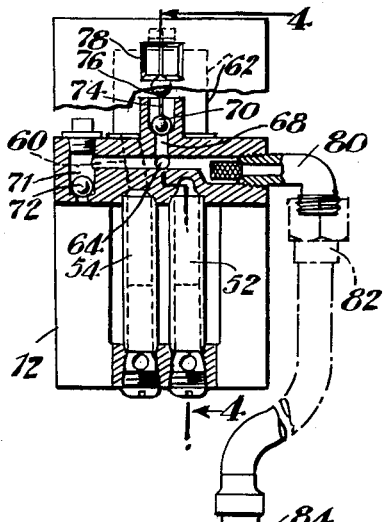
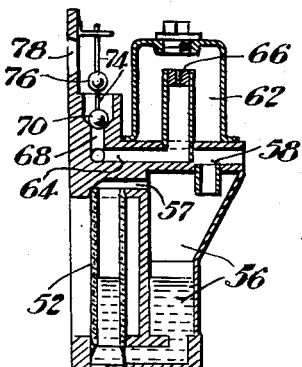
Fig. 4.
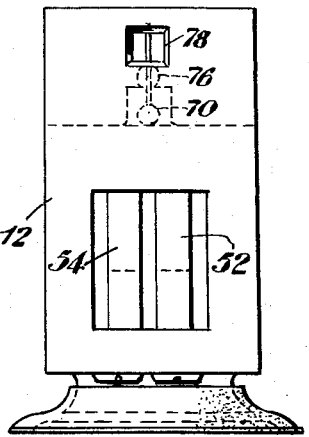
Fig. 5.
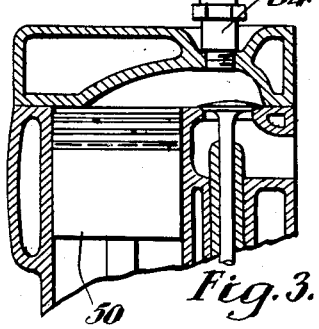
Fig. 3.
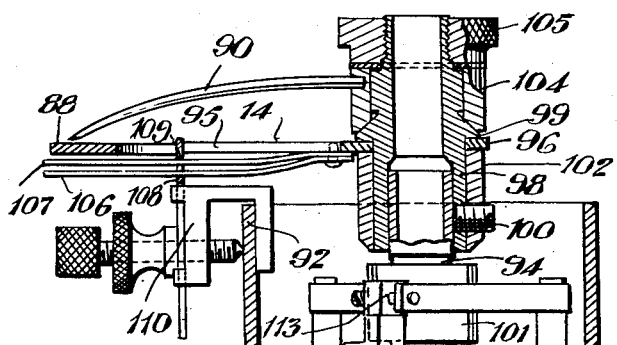
Fig. 6.
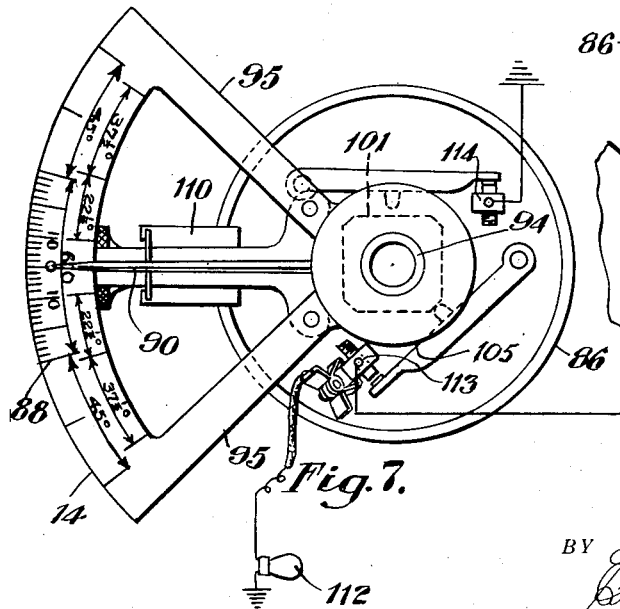
Fig. 7.
INVENTOR
JOHN D. MORGAN
BY
Edmund G. Borden ATTORNEY Patented June 9, 1936

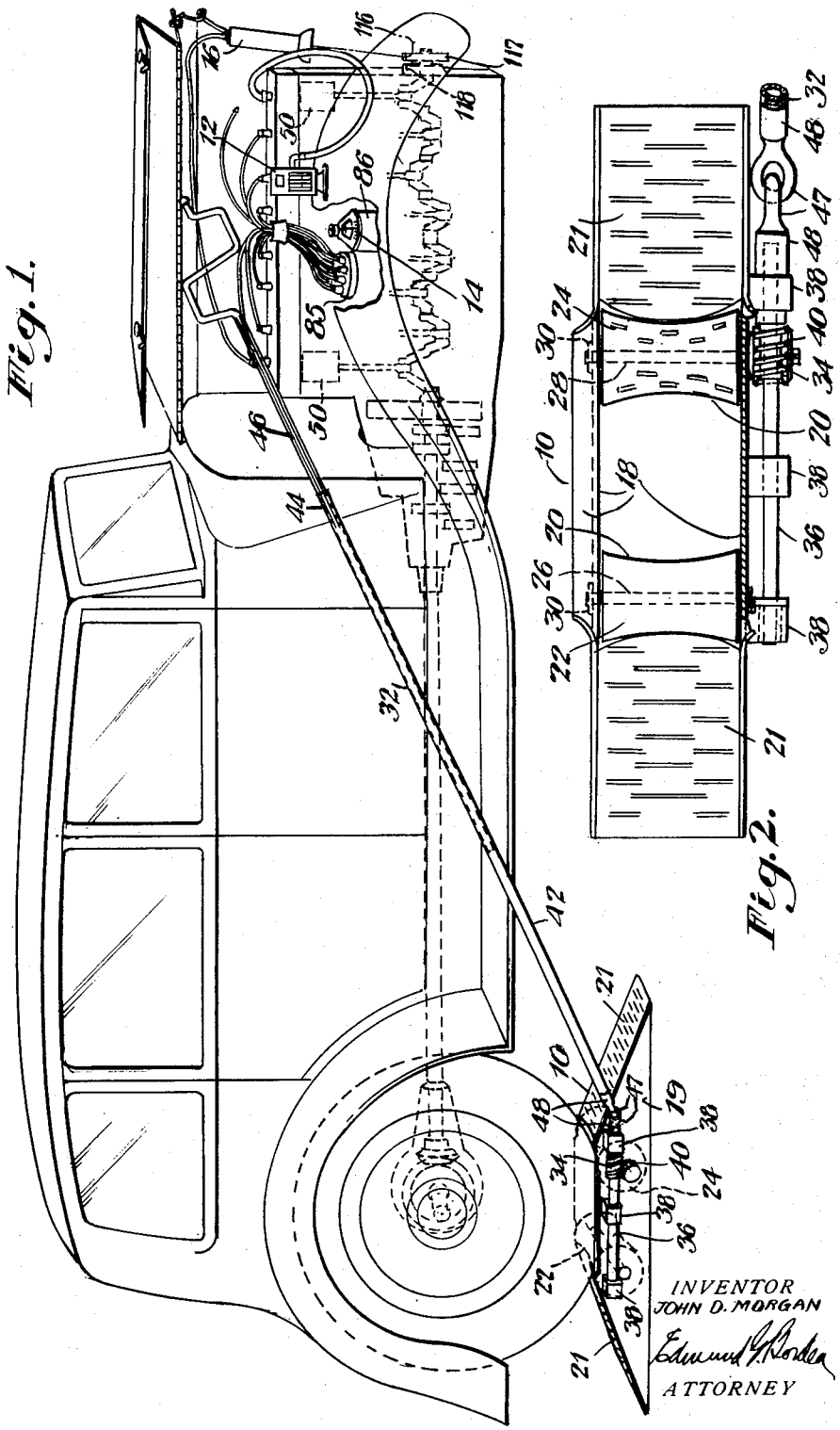

2,043,931

UNITED STATES PATENT OFFICE 2,043,931

MOTOR TIMING METHOD AND APPARATUS

John D. Morgan, South Orange, N. J., assignor to Doherty Research Company, New York, N. Y., a corporation of Delaware Application August 15, 1933, Serial No. 685,219

4 Claims. (Cl. 177—311)

This invention relates to the adjustment of the timing of the ignition system of an internal combustion engine, and more particularly it concerns improved method and apparatus especially adapted for making rapid and accurate adjustments of the ignition timing of an automotive engine.

Correct ignition timing of an internal combustion engine is a factor of major importance in the attainment not only of maximum speed and power, but also of maximum economy and efficiency of operation. The factor of correct ignition timing is even more important than the factor of correct proportioning of the fuel and air supplied to the engine from the carbureter, as is shown by the fact that the engine is more sensitive to adjustments of ignition timing than it is to any other adjustment. With a properly timed ignition system almost any internal combustion engine, even one designed for operation at a high compression ratio, can be made to operate satisfactorily without spark knock when using ordinary straight run gasoline as fuel.

The primary object of the present invention is to provide improved method and means whereby even an unskilled operator may rapidly and accurately check and adjust the ignition timing of an automotive engine.

In checking the ignition timing of an automotive engine cylinder, a very important step is that of locating the top dead center position of the piston in the cylinder at the end of its compression stroke within an allowable tolerance of .001 of an inch of piston travel. This is because the ignition is timed with reference to the top dead center position of the piston. Moreover it is desirable to carry out the ignition timing operation rapidly and without removing the cylinder head or otherwise seriously disrupting the normal operating condition of the engine.

Methods and instruments heretofore developed for checking ignition timing and for locating the top dead center position of automotive engines are in general relatively complicated, inconvenient, time-consuming and inaccurate, particularly in the hands of an unskilled operator. One method heretofore employed for locating the top dead center position of an engine piston has been by inserting a wire or other displacement member into the ignition space of a cylinder through a priming cock or through an open spark plug socket, with the lower end of the wire resting on the top of the cylinder, and then hand cranking the engine until the wire is raised by the piston to its apparent highest point. This method is difficult in application and subject to considerable error because of uneven carbon deposit on the piston head, and because most modern engines are not fitted with priming cocks; and in many engines, as for example those of the L head type, spark plug sockets are offset to one side of the cylinder or are so relatively small as to make it difficult and sometimes impossible to use the ordinary type of displacement gauge for locating top dead center position.

Another method heretofore employed for ignition timing has involved hand cranking of the engine until the piston in a reference cylinder (usually No. 1 cylinder) is at the top dead center position of the compression stroke, as indicated by a mark such as "D. C. 1—4" placed by the manufacturer on the engine fly-wheel. Many modern automobiles, however, have no facilities for hand cranking and/or have inacccessible or unmarked fly-wheels.

Another object of the present invention is to provide mechanism whereby even an unskilled operator can quickly locate the top dead center position of a piston at the end of its compression stroke within a limit of accuracy under .001 of an inch of piston travel.

Another object of the present invention is to provide mechanism whereby even an unskilled operator can hand-crank any automobile engine in either direction with facility and without any of the difficulties usually encountered in hand cranking to the top dead center position of a piston on compression stroke.

Another object of the present invention is to provide improved method and means whereby operation of the mechanism governing both the fixed and automatic spark advance of an automotive engine ignition system can be accurately checked while the engine is in operation at varying speeds.

Calculations and check tests on the clearance or ignition space of a common type of four-cycle engine cylinder between the piston head and spark plug opening show that each .001 of an inch of piston travel toward or away from its top dead center position respectively results in an increase or drop in pressure of less than ½ inch water pressure starting from atmospheric pressure. The top dead center indicating gauge forming part of the subject-matter of the present invention, in its preferred form, is accordingly featured by embodying as an element a special modified form of double U-tube manometer with calibrated orifice and pressure and vacuum relief valve fittings adapting the gauge for accurate and reliable indications of pressure changes within a range of less than ½ inch water pressure above and below atmospheric.

With the above and other objects and features in view, the invention consists in the improved method and apparatus for checking ignition timing of an automotive engine which is hereinafter described and more particularly defined in the accompanying claims.

In the following description of the invention, reference may be had to the accompanying drawings in which:

Fig. 1 is a view in perspective (somewhat diagrammatic) illustrating application of the invention to the adjustment of the ignition timing of an automotive engine of the straight eight type.

Fig. 2 is a top plan view of the precision cranker shown under the right rear wheel of the automobile displayed in Fig. 1.

Fig. 3 is a view in front elevation, with parts in section, showing a preferred type of instrument for use in locating the top dead center position of the engine.

Fig. 4 is a side view in vertical section of the instrument shown in Fig. 3, taken along the plane 4—4 of Fig. 3.

Fig. 5 is a view in front elevation of the same instrument illustrated in Figs. 3 and 4.

Fig. 6 is a view in vertical section illustrating the synchronizer element of the present invention as applied to a common form of distributor.

Fig. 7 is a top plan view of the synchronizer and distributor shown in Fig. 6.

The preferred method of checking ignition timing according to the present invention contemplates positioning a precision cranker or rollator 10 under a rear drive wheel of the automobile under test. By employing a precision cranker of the type illustrated the operator can easily and smoothly hand-crank the engine forward and backward to the precise top dead center position of the piston on compression stroke. To inform the operator when the piston has reached top dead center position on compression stroke, the invention contemplates mounting a top dead center indicating pressure gauge 12 in operative communication with the ignition space of the engine cylinder under test and in full view of the operator as he turns the handle of the precision cranker. Gauge 12 is designed to show the operator when the piston has reached the top of its compression stroke within a limit of accuracy under one thousandth of an inch piston travel.

A synchronizer or protractor 14 has its radial arm and quadrant scale attached respectively to the timing shaft and housing of the distributor element of the ignition system after the cap and rotor of the distributor have been removed. After locating top dead center position of the piston the operator sets the radial arm or indicator needle of the synchronizer at zero position on the quadrant scale, graduated in engine crank angle degrees. The operator then advances the piston of the cylinder under test to a predetermined optimum fixed advance firing position for slow engine speed by using the precision cranker and the quadrant scale and indicator needle of the synchcronizer. The interrupter points of the distributor are then checked and adjusted for firing a fuel charge in the cylinder with the piston in this position and the spark lever, if any, fully advanced. After adjusting the fixed spark advance of the cylinder under test the operator can start the engine and check and adjust the operation of the centrifugal governor controlling the automatic spark advance for various engine speeds, by means of a stroboscope lamp 16 connected in the secondary ignition circuit, and oppositely disposed index marks respectively placed on the fan belt pulley and stationary engine casing to mark the fixed advance firing position of the cylinder under test, as hereinafter more fully explained.

As illustrated in Figs. 1 and 2, the principal elements of the precision cranker 10 include an open top box frame 18 having a rectangular horizontal base and spaced parallel side plates 19 between which is supported a roller cradle for a drive wheel of the automobile. The frame 18 is provided with end plates 21 which serve as ramp approaches up which an automobile drive wheel can be driven and thereby elevated onto cradle 20. The cradle 20 is formed by a pair of rollers 22 and 24 mounted in parallel spaced relation transversely of the frame 18 on horizontal shafts 26 and 28, respectively. Shafts 26 and 28 are journaled in bearings 30 formed in side plates 19 of frame 18. The spaces separating rollers 22 and 24 from each other and from the end plates of frame 18, and the length and diameter of the roller faces, are proportioned to provide a cradle to fit inflated pneumatic automobile wheel tires of all standard sizes. Roller 22 functions simply as an idler, while roller 24 is the driving element of the cranker 10 and is provided with a non-skid or friction tread surface to engage a wheel tire without slippage. The roller 24 may be rotated manually by the operator by means of linked members including an extension crank arm 32, a worm gear 34 mounted on a shaft 36 which is journaled in bearings 38 on the frame 18, and a pinion 40 keyed to an extension of shaft 28 with its teeth in meshed relation with worm gear 34. Ramp plates 21 are provided with non-skid or friction tread top surfaces and lie at an oblique angle preferably less than 30° to the base of frame 18, thereby permitting a tired automobile wheel to be driven onto the cradle formed by rollers 22 and 24 without difficulty. The crank arm 32 comprises a tubular sleeve element 42 having a hollow socket 44 of hexagonal cross section at its free end; and an extension crank rod 46 of hexagonal cross section designed for loose journal fit in sleeve 42 and meshed fit with socket 44 as shown. The pivoted end of sleeve 42 is connected to worm shaft 36 by linked I-bolts 47 and threaded sleeve fittings 48.

To use the precision cranker a rear drive wheel of the car is driven onto the roller cradle, and by turning the handle of crank arm 32 with the engine in gear and the ignition off, the operator cranks the engine through the rear axle, differential and drive shaft, thereby reciprocating the pistons 50 in the engine cylinders. Sufficient mechanical advantage is afforded by a speed reduction ratio of say 10:1 between the worm gear and pinion elements of the precision cranker, to enable the operator to easily crank the engine against the full compression resistance of all the cylinders. With rollers of approximately 4" in diameter supporting a tired automobile wheel of about 30" O. D., and with the automobile geared to a 4:1 speed ratio between the engine and drive wheel, the speed reduction ratio between the crank arm of the precision cranker and the engine is about 20:1. The precision cranker enables the operator to turn the engine smoothly in either direction to bring a piston to top dead center quickly without having to turn the engine over twice whenever the piston has over-run top dead center position while employing the ordinary hand crank attachment.

Referring to Figs. 1 and 3 to 6 of the drawings, the top dead center gauge 12 is shown as comprising a special form of double U-tube manometer including upright legs in the form of gauge glasses 52 and 54, each communicably connected at their lower ends to a common liquid reservoir 56 comprising the central leg. A gauge liquid of about the same density as water but having a lower vapor pressure and lower surface tension, such as standard S. T. 37 hexylresorcinol solution, is preferably employed in gauge 12. Gauge glass 52 and reservoir 56 have their upper ends connected by passage 57 and ported to atmosphere through passage 58 in the gauge housing. The top of gauge glass 54 is ported out through a passage 60 into a sealed pressure chamber 62 which in turn is communicably connected to manifold 64 by a removable apertured orifice member 66 having an orifice of very small, almost capillary, size. Ported out from manifold 64 is a lateral pressure relief passage 68 having an outlet to atmosphere which is normally closed against outflow of air or gas by a ball valve 70 preferably weighted to hold its seat except when pressure in manifold 64 exceeds 5" water pressure. A pressure of 3" of water is normally sufficient to hold valve 70 open after it has left its seat under a 5" water pressure. A lateral vacuum relief passage 71 opens from atmosphere into manifold 64, passage 71 being normally closed against inflow of air from atmosphere to the manifold by a ball valve 72 which is preferably weighted to hold its seat except when there is a vacuum in the manifold exceeding −1" of water pressure. On a stem 74 attached to pressure relief valve 70 there is mounted a colored signal disk 76 which is lifted into the field of vision of a small peephole 78 cut in the front panel of gauge 12, whenever the valve 70 is raised off its seat. The gauge 12 is shown as operatively connected to the combustion chamber of #1 cylinder of the automobile engine under test through an elbow fitting 80 having a filter screen attachment at the inlet end of manifold 64; together with a flexible tube and coupling element 82 and an adapter fitting 84 threadably engaging the spark plug opening in the cylinder head.

To locate top dead center position of an engine piston, the operator removes a spark plug from its socket and connects the dead center gauge 12 to the clearance or ignition space of No. 1 cylinder for example. By means of the hand crank the piston is moved upwardly on a compression stroke, and sufficient pressure is developed ahead of the piston and in gauge manifold 64 to lift valve 70 off its seat and at the same time to depress the level of liquid in glass 54 and slightly raise the level of liquid in gauge glass 52. The cross sectional area of reservoir 56 is relatively large as compared to the area of legs 52 and 54, so that application of pressure or vacuum to the liquid in leg 54 causes a proportionately magnified change in liquid level in leg 54 without effecting any substantial change in the level of liquid in leg 52 and reservoir 56. Movement of a 3" piston at normal cranking rate as much as one thousandth of an inch away from its top dead center position has been found to shift the comparative levels of gauge liquid in glasses 54 and 52 almost 1". The operator turning the crank arm 32 is apprised of the fact that the engine is on its compression stroke through observing the drop in level of liquid in gauge glass 54 and the signal disk 76 raised in the line of vision of peephole 78.

As the piston approaches its top dead center position on the compression stroke, its speed decreases, and the rate of flow of air out of the engine cylinder into gauge 12 therefore diminishes. Valve 70 may therefore close at a point in the piston travel slightly before top dead center of compression because leakage of air occurs from the ignition space of the cylinder past the piston and/or past the relief valve 70 when seated, at a sufficient rate so that the operator finds that turning the piston a very few degrees past top dead center brings the liquid in gauge glass 54 to or above the level of liquid in glass 52. By cranking the engine back and forth two or three times a few degrees on either side of the top dead center, the operator quickly locates the piston at the exact top dead center of compression stroke by reason of the fact that leakage of air from the space above the cylinder results in quickly bringing the gauge liquid in legs 52 and 54 to the same level with the piston at top dead center of compression stroke.

The next step to be taken after locating the top dead center position of the piston, is to check the ignition timing relative to this top dead center position. To do this the cap 85 of distributor 86 and also the distributor rotor must first be removed. The principal elements of the synchronizer 14 comprising a quadrant scale 88 and a radial arm pointer 90, are then clamped respectively to the upper rim of the distributor housing 92 and to the distributor timing shaft 94 (Fig. 6 and Fig. 7). The quadrant scale 88 is graduated in degrees representing angular displacement of the crank shaft of the engine. Scale 88 is rigidly connected by arms 95 to an axially apertured ring washer 96. The aperture of ring 96 is dimensioned to slip over shaft 94 and form a loose journal fit over a bushing 98 below a shoulder 99 thereof. Bushing 98 is clamped to the end of shaft 94 by a set screw 100, at a point on the shaft above interrupter cam 101. A collar 102 is clamped to bushing 98 below ring 96 for the purpose of holding the ring against shoulder 99 but with sufficient play to permit relative rotation of the ring and scale 88 with respect to bushing 98 and shaft 94. A collar 104 is loosely journaled on the upper part of bushing 98 above shoulder 99, and may be clamped thereto or disconnected therefrom by turning a centrally apertured screw cap 105 which threadedly engages the upper part of bushing 96. Pointer element 90 of the synchronizer is rigidly mounted on collar 104 with its pointer end in closely spaced relation over the degree scales on quadrant 88. Two oppositely tensioned springs 106, 107 are pivotally connected at one end to ring 96, and a hanger strip 108 is provided with a central slot 109 slidably journaled on springs 106, 107. Hanger 108 serves to connect springs 106, 107, to clamp 110, and thereby provides the connecting link for adjustably spacing the clamp from ring 96 to fit distributor housings of varying sizes.

To check the fixed advance firing position of the piston in cylinder No. 1 relative to the top dead center position of the piston on compression stroke, the screw cap 105 of the synchronizer 14 is loosened and pointer 90 is clamped over the central zero degree mark on quadrant scale 88. It will be understood that the distributor shaft 94 makes one revolution for every two revolutions of the engine crank shaft, so that a 45° rotation of shaft 94 corresponds to a 90° engine crank shaft rotation. The piston in No. 1 cylinder having been previously located at its top dead center of compression stroke, the engine is now turned backward by means of the precision cranker 10 to shift the piston to its proper firing position, when pointer 90 reaches the mark on the outer degree scale of quadrant 88 which is specified by the manufacturers as the proper fixed advance firing position of the piston for idling low speed operation of the engine. This point may be for example 6° before the top dead center position on compression stroke.

The distributor of the engine illustrated is of the type in which the timing adjustment is made by loosening a timing adjustment and advance arm lever clamp screw 111 and then rotating the distributor housing and interrupter points while the distributor shaft and interrupter cam remain stationary. A small six volt lamp 112 (Fig. 7) is connected in the primary circuit of the ignition system across the interrupter points as by having its lead wires respectively grounded and attached to one of the adjustment nuts of the interrupter point 113. With the housing of the distributor free to rotate relative to the distributor shaft and pointer 90, the housing 92 is turned to again bring the zero point on the quadrant scale under the pointer 90, and before this point is reached the lamp 112 should light if the fixed spark advance is properly timed. The length of time that the lamp remains lit is governed by the "dwell" of the interrupter cam in contact with the interrupter arm. The ignition spark really occurs at the instant the interrupter points separate, i. e. at the instant lamp 112 goes out. However for purposes of rough check it is sufficient if the interrupter points of the circuit breaker are adjusted to the fixed advance firing position to separate and light the lamp 112 at this point, it being recalled that at this point the piston of No. 1 cylinder is in the correct firing position. In making this adjustment it will be understood that the distributor housing is turned about shaft 94 in a direction opposite to the normal direction of rotation of the distributor rotor. After making this adjustment of the ignition timing of No. 1 cylinder, the distributor housing 92 is again clamped to timing shaft 94 by tightening up screw 111.

Bushing 98 and cap 105 of the synchronizer 14 are centrally apertured to permit employment of the synchronizer with that type of distributor in which the timing adjustment screw is located within the central bore of the distributor shaft; this type of distributor being adjusted by loosening a cone wedge which normally clamps the interrupter cam in fixed relation to the distributor shaft, thereby permitting rotation of the interrupter cam relative to stationary distributor shaft, distributor casing and interrupter points.

The various graduated degree scales provided on the quadrant 88 (Fig. 7), afford convenient means for checking and synchronizing the spark timing of all other cylinders of the engine after the ignition timing of No. 1 cylinder has been correctly set. Thus an automotive engine of the type illustrated is normally equipped with twin interrupter points in the primary circuit, each governing separate secondary ignition circuits, in which case, after adjusting the timing of No. 1 cylinder as described, lamp 112 may be disconnected from the interrupter point 113 of the circuit breaker which governs the delivery of high voltage current to the spark plug of No. 1 cylinder, and connected to an interrupter point 114 of the circuit breaker controlling the supply of high voltage current to the engine cylinder which follows No. 1 in firing order (i. e. #3 cylinder in an engine of the straight eight type). The engine is now turned over by the precision cranker until pointer 90 reaches a point on quadrant scale 88 which is 45° in advance of the zero point which now marks the firing position of No. 1 cylinder. At this point lamp 112 should light if the ignition timing of No. 3 cylinder is synchronized with that of No. 1 cylinder. If the lamp does not light, the contact point 114 of the circuit breaker is adjusted until No. 3 cylinder will fire at this point. In a straight eight cylinder car of the type illustrated having a circuit breaker including a four point cam and two rubbing blocks 45° apart, it is only necessary to check the spark timing of two of the cylinders as described, because the other engine cylinders are fired in phase with the two cylinders checked, through the same circuit breaker interrupter points 113 and 114.

Most modern automotive engines are equipped with centrifugal governors which function to automatically advance the spark upon acceleration of the engine speed above the idling speed for which the fixed spark advance is adjusted. To check the automatic spark advance the engine must be placed in operation at the speed at which it is desired to check. A low voltage filament lamp of the type of lamp 112 is not adapted for use in ignition timing during operation of an automotive engine.

To check the operation of the governor controlling the timing of the automatic spark advance of No. 1 cylinder, the lamp 112 is disconnected and synchronizer 14 is detached from the distributor and the rotor arm and cap of the distributor replaced. The top dead center gauge 12 is disconnected from No. 1 cylinder by removal of adapter fitting 84, and the spark plug of No. 1 cylinder is inserted in its threaded socket and connected to the high tension feed cable leading off from the distributor cap. The stroboscopic timing lamp, filled with a fluid such as neon gas or mercury vapor which lights up substantially instantaneously and remains lighted only during a period of high voltage current flow therethrough, is now connected in the secondary electric circuit of the ignition system by suitably grounding one lead of the stroboscopic lamp and attaching the other lead to the wire which conducts high voltage induced current to the spark plug of a cylinder of the engine firing in phase with No. 1 cylinder (Fig. 1). A suitable stroboscopic lamp for this purpose is described in the copending patent application of P. B. Leavitt, Serial No. 645,762, filed Dec. 5, 1932. The lamp 16 is illustrated as connected to the wire carrying current to the spark plug of No. 8 cylinder of the Packard type engine illustrated. With the piston of No. 1 cylinder in its correct firing position, a reference mark 116 is made on the periphery of fan belt pulley 117, as with chalk, and a fixed index mark 118 is made on the crank case or stationary frame of the engine immediately adjacent and opposite the mark 116 on the fan pulley. The engine under test is now thrown out of gear so as to disconnect the precision cranker 10, after which the engine is started. With the engine running at slow idling speed the marks 116 and 118 should appear to remain stationary and opposite each other when viewed in the illumination field of the timing lamp 16, unless there has been some error in setting the timing of the fixed spark advance. Thus the lamp 16 may be used in place of the lamp 112 for checking the timing of the fixed spark advance of one cylinder, and also for synchronizing the ignition circuits of two or more cylinders.

With the fixed spark advance properly timed, the engine is now speeded up to a high speed of say 3000 to 3200 R. P. M., and operation of the automatic spark advance under the control of centrifugal governor 120 is checked by observing the apparent relative positions of the marks 116 and 118 when viewed in the illumination field of the stroboscopic lamp 16. If the automatic spark advance is functioning properly, the mark 116 on the fan belt pulley will appear to have moved backward with respect to the direction of pulley rotation, and away from index mark 118. The degree of automatic spark advance is measured by the amount of such apparent backward movement of reference mark 116, and if this does not check with the automatic spark advance specified by the manufacturers of the engine at the speed at which the engine is operated during the test, adjustment of the automatic spark advance to the correct predetermined amount can normally be made in a well-known manner by changing the springs and weight setting of the governor 120.

By employing the method and apparatus of the present invention it is possible for even an unskilled operator to effect a full, accurate and relatively rapid adjustment of the various elements concerned with the correct timing of the ignition circuit or circuits of an automotive internal combustion engine. The precision cranker can be operatively connected to the automotive engine ready for the test in the time required to throw the engine in gear and to drive the automobile onto the roller cradle. The precision cranker is adapted for use with all types of cars and is designed for use by an operator standing on either side of the car engine. The top dead center gauge is extremely simple in design and operation and requires no accessory parts other than adaptors to fit various sizes of spark plug openings. This gauge can be attached to the engine cylinder ready for test in the time required to remove the spark plug and insert the adaptor, and even an unskilled operator can very quickly turn the engine over by the precision cranker to the top dead center position of a piston on the compression stroke. The precision cranker and the top dead center gauge are designed so that the operator can stand in one position while locating the top dead center position of the piston and while checking the timing of the fixed spark advance and of the automatic spark advance by means of the synchronizer and by means of the stroboscopic lamp.

The invention having thus been described, what is claimed as new is:

1. In checking the ignition timing of an internal combustion engine equipped with an automatic spark advance attachment, the steps comprising, hand-cranking the engine with its ignition off to bring one of its pistons to a predetermined fixed firing position for idling speed in advance of top dead center on compression stroke, checking the interrupter points which control supply of induced high voltage electric current to the ignition element of the cylinder in which said piston is mounted to see that their separation causes current to flow to said device at the instant that the piston reaches said advanced firing piston on compression stroke, applying adjacent oppositely disposed chalk marks respectively to a moving part of the motor and to a stationary part to mark said fixed advance firing position, placing the motor in operation with the ignition on, intermittently illuminating a stroboscopic lamp by means of the secondary high voltage current flowing to the ignition device, and observing the relative position of the moving reference mark on the motor with respect to the stationary index mark when viewed in the illumination field of said lamp while operating the motor at a predetermined high speed.

2. In checking the ignition timing of an internal combustion engine, the steps comprising hand-cranking the engine with its ignition off to advance the piston of the engine cylinder to top dead center of compression stroke, holding the piston at top dead center position while checking the degree of crank advance before top dead center at which the interrupter points in the primary circuit separate and thereby induce flow of secondary high voltage current to the spark plug of the cylinder in which said piston is located, said fixed spark advance being further checked by placing the engine in operation at low speed, illuminating a stroboscopic lamp by means of the current flowing in the secondary high voltage ignition circuit, and observing the apparent relative fixed positions of a reference mark on a moving part of the motor of the engine with respect to a stationary index mark when viewed in the illumination field of said lamp.

3. In checking the ignition timing of an automobile engine equipped with an automatic spark advance attachment, the steps comprising, hand-cranking the engine with its ignition off to advance the piston in said cylinder to its top dead center of compression stroke, marking with chalk adjacent oppositely disposed marks on a fan belt pulley and on the engine casing, respectively, with the piston in top dead center position, placing the engine in operation, intermittently illuminating a stroboscopic lamp by means of the induced high voltage electric current flowing to the spark plug of the engine cylinder under test, and observing the relative distance separating the moving reference mark on the fan belt pulley from the fixed index mark when viewed in the illumination field of said lamp with the engine operating at a predetermined speed.

4. In adjusting the ignition timing of an automotive engine equipped with an automatic spark advance attachment and having a stroboscopic timing lamp temporarily connected in the circuit supplying high voltage electric current to the spark plug of a cylinder in firing phase with a cylinder to be checked, the steps comprising cranking the engine with the ignition off to bring the piston in said cylinder to be checked to a predetermined position representing the optimum low speed firing position of said piston before top dead center of compression stroke, placing a reference mark on the fan belt pulley and an adjacent oppositely disposed index mark on the stationary engine casing with the piston in said advance firing position, placing the engine in operation at low speed with the ignition on and observing the apparent relative positions of the reference and index marks when viewed in the illumination field of said lamp, shifting the relative positions of the interrupter points of the ignition system with respect to the interrupter cam until said reference and index marks remain apparently fixed and opposite each other when viewed in the illumination field of said lamp with the engine operating at low speed, then operating the engine at a predetermined high speed and adjusting the governor controlling the automatic spark advance until the distance apparently separating said reference mark and index mark when viewed with said lamp corresponds with the optimum degree of angular spark advance at the speed at which the engine is operated.

JOHN D. MORGAN.